United States Patent [19]

Ruch et al.

[11] Patent Number: 4,852,391
[45] Date of Patent: Aug. 1, 1989

[54] PIPELINE VEHICLE

[75] Inventors: Ola Ruch, Flataasen; Trond V. Johansen, Trondheim; Ludvig Naess, Tiller, all of Norway; Horst Poerner, Roettenbahn; Georg Gebhard, Erlangen, both of Fed. Rep. of Germany; Robert Weber; Max Heller, both of Uttenreuth, Fed. Rep. of Germany

[73] Assignee: Den Norske Stats Oljeselskap A.S., Stavanger, Norway

[21] Appl. No.: 130,226

[22] PCT Filed: Apr. 9, 1987

[86] PCT No.: PCT/NO87/00027
§ 371 Date: Feb. 16, 1988
§ 102(e) Date: Feb. 16, 1988

[87] PCT Pub. No.: WO87/06323
PCT Pub. Date: Oct. 22, 1987

[30] Foreign Application Priority Data

Apr. 14, 1986 [DE] Fed. Rep. of Germany ....... 3612498
Nov. 19, 1986 [NO] Norway ................ 864605

[51] Int. Cl.[4] ............................................. F16L 55/00
[52] U.S. Cl. ................................................. 73/40.5 R
[58] Field of Search ....................................... 73/40.5 P

[56] References Cited

U.S. PATENT DOCUMENTS

| 3,837,214 | 9/1974 | Guest | 73/40.5 P |
|---|---|---|---|
| 4,050,384 | 9/1977 | Chapman | 73/40.5 P X |
| 4,112,850 | 9/1978 | Sigel-Gfeller | 73/40.5 P X |
| 4,170,902 | 10/1979 | Pallan | 73/40.5 P X |
| 4,177,734 | 12/1979 | Rhoden | 73/40.5 P X |
| 4,272,984 | 6/1981 | Bell | 73/40.5 P |
| 4,460,920 | 7/1984 | Weber et al. | 358/100 |
| 4,646,787 | 3/1987 | Rush et al. | 73/40.5 P X |

FOREIGN PATENT DOCUMENTS

| 2443627 | 4/1976 | Fed. Rep. of Germany ... 73/40.5 P |
|---|---|---|
| 3142768C2 | 4/1984 | Fed. Rep. of Germany . |
| 3417865.1 | 5/1984 | Fed. Rep. of Germany . |
| 3610624.0 | 3/1986 | Fed. Rep. of Germany . |
| 3610626.7 | 3/1986 | Fed. Rep. of Germany . |
| 3610625A1 | 10/1987 | Fed. Rep. of Germany . |
| 862775 | 1/1988 | Norway . |
| 1565049 | 4/1980 | United Kingdom . |
| 1362580 | 8/1984 | United Kingdom . |
| 2153040A | 8/1985 | United Kingdom . |

Primary Examiner—Stewart J. Levy
Assistant Examiner—Joseph W. Roskos
Attorney, Agent, or Firm—Foley & Lardner, Schwartz, Jeffery, Schwaab, Mack, Blumenthal & Evans

[57] ABSTRACT

Self-driven vehicle for pipelines comprising: a cylindrically designed vehicle body (1) through which and/or around which the pipeline's (10) medium flows, a drive unit (2) on the vehicle body (1) which resiliently bears against the pipeline's (10) internal surface, a hydraulic system which powers the drive module (2), a power supply system for operation of the hydraulic system, and a controller (22) which at least controls the vehicle's movement in the pipeline (10).

14 Claims, 9 Drawing Sheets

PIPELINE VEHICLE

This invention relates to a self-driven vehicle for a pipeline.

TECHNICAL FIELD

In pipelines for oil and gas, there is a need for a device which enables internal inspection and maintenance. For such purposes, it is usual today to use pigs which are conveyed with the fluid flow through the pipeline. However, current pigs have a limited range of application, and their use will for instance not be feasible in connection with repairs on the inside of a pipeline.

A crack in a pipeline, which is situated on the sea bed and transports natural gas, for example a leakage close to a drilling platform, will cause gas to flow out for an extended period of time, even although the pipeline is rapidly shut down. If the gas ignites, the installation and its personnel would be in great danger.

BACKGROUND ART

Gradually equipment has been developed, for example, shut-down devices which can be transported into, and parked, for either a short or a longer period of time, at an intended position in a pipeline. An example of such equipment is valves of the kind which are described in Norwegian patent application No. 862775. These are valves which are intended to be placed permanently in the pipeline when in ordinary operation and which automatically, or by signal can shut down the pipeline in the case of fracture or catastrophe situations on or in the vicinity of a platform.

From DE PS No. 3142768C2, a pipeline is known which transports inflammable gas, and into which, in the case of pipeline fracture or leakage, a shut-down mechanism can be inserted, in order to join the flowing medium and consequently cause insignificant damage. The known shut-down mechanism consists of a cylindrical body, which in the case of an accident is launched into the pipeline from a platform and which via the pressure from the pipeline medium, with a piston-like action, is passed through the pipeline. The shut-down device is attached to the pipeline in the vicinity of the leakage locality. This is achieved by means of remote controlled pressurised air vessels, placed inside the cylindrical body, which supply gas to a rubber pod which is situated in an external bushing against the pipeline wall and which keeps the shut-down device restrained in the pipeline. In this way, further flow of the medium to the leakage locality is prevented. When employing this shut-down device, considerable time is required until the shut-down device is led forward to the leakage locality, in the case of pipeline fracture or a leakage.

In the German patent application No. P 3610625.9, a shut-down device is described wherein the pipeline medium can flow through an open cylinder and a valve is arranged for the purpose of shutting off the flow of the pipeline medium. This shut-down device can be inserted into the pipeline prior to an arising leakage, and in the case of a pipeline fracture, the valve actuates an immediate closure of the pipeline's fluid flow. Under normal conditions, the pressure drop of the fluid medium across the valve when the valve cone is open, is utilized to create the shut-down device's power of adherence.

Similar barrier systems are described in the German applications Nos. P 3610624.0 and P 3610626.7.

From the German patent application No. P 3417865.1 a self-driven inspection and maintenance vehicle for pipeline systems is known comprising a vehicle body and a drive unit and where the vehicle body is resiliently supported against the internal surface of the pipeline. The vehicle body is designed as a rigid, tightly closed housing and is provided with a separate electrical power supply. On the frontal surface relative to the launching direction the vehicle carries a T.V.-camera and a source of light to provide the T.V.-camera sufficient visibility. This inspection and maintenance vehicle can only be launched into empty and pressureless pipelines.

DISCLOSURE OF INVENTION

The purpose of the present invention is to provide a vehicle which can, without interfering with pipeline operations, convey a shut-down device which is inserted into the pipeline and is anchored there, and in a similar way can be taken out, it being possible to carry out this operation against the flow direction of the pipeline medium.

This purpose is achieved, according to the invention, by means of a self-driven vehicle for pipelines, comprising a cylindrical vehicle body through, and/or around which, the pipeline medium flows, a drive unit on the vehicle body which is resiliently supported against the pipeline's inside surface, a hydraulic system which operates the drive unit, a power supply system to energize the hydraulic system, a control unit which at least controls the movements of the vehicle.

In a favourable embodiment, the vehicle body has arranged at each end mechanically moveable coupling parts which engage the corresponding coupling parts on a moveable device in the pipeline.

Since the vehicle according to the invention permits a device to be placed into and removed from a pipe without affecting operational disturbances, considerable saving in expenses can be achieved. Further, in addition to the transportation in and out of, for instance, a pipe shut-down device, the vehicle can also be used for inspection and supervision of the pipe and/or the pipe shut-down device.

In the case of the known units for insertion into pipes, which are not flushed by the pipeline medium, it is necessary to change the direction of the flow and from a close-by platform, flush out the inserted pipeline tool, or, without changing the current's direction, to pass the device through from a more distant platform.

With the vehicle according to the invention, it will be possible to execute this operation from one single platform.

BRIEF DESCRIPTION OF DRAWINGS

In the following, the invention will be described in more detail with reference to the accompanying drawings wherein.

MODES FOR CARRYING OUT THE INVENTION

Figure 1:
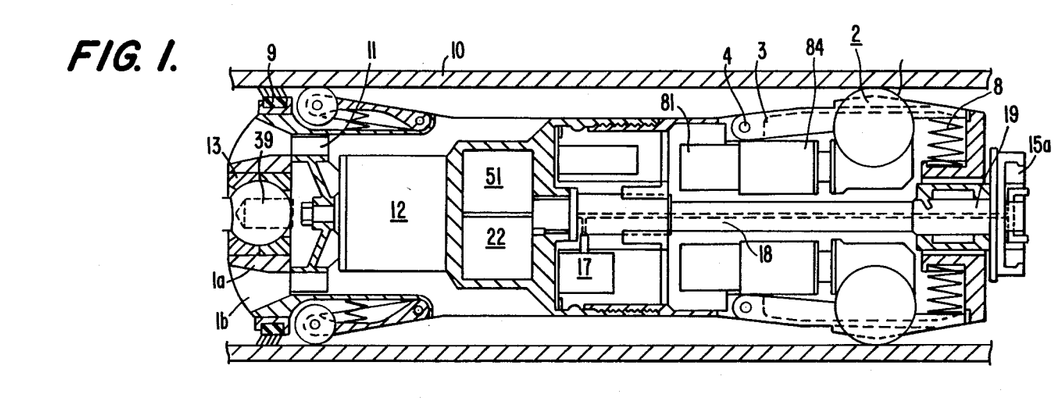
FIG. 1 shows a longitudinal section of a vehicle.

In FIG. 1 there is shown a cylindrically formed vehicle body 1 equipped with a drive unit 2, which is all over symmetrically segmented. The vehicle body's 1 diameter is smaller than the pipe-line's 10 internal diameter, in which the vehicle is placed. In order to be able to pass through small pipe radii, the vehicle body is designed with articulated connections. The drive unit 2 comprises a pivot arm 3, which is pivotally connected to a revolving journal 4 and supports a motor 81 with gear 84, which is for example connected to drive wheel 82 which can be designed as twin wheels.

Figure 3:
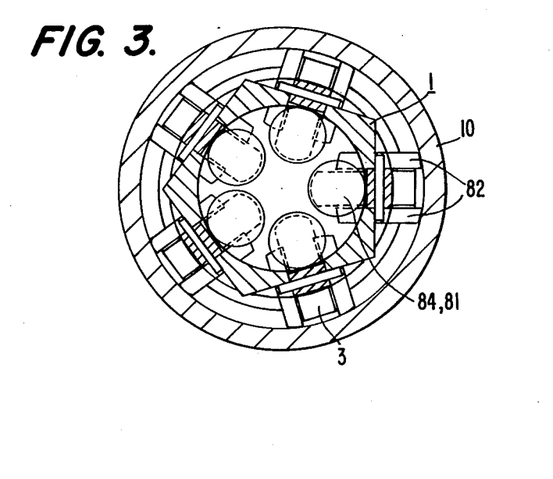
FIG. 3 shows a cross section of the vehicle in FIG. 1.

The drive wheels 82 support themselves resiliently to the pipeline's 10 internal surface (see also FIG. 3). They are via the force from a spring 8 with great pressure pushed against the pipeline's 10 wall. The pipeline medium flows partly through and partly around the vehicle body 1. On one of the sides of the vehicle body 1 a turbine 11 is mounted, which is powered by the pipeline fluid which flows through the vehicle body. The turbine 11 is coupled to a generator 12. The gap between the vehicle body 1 and the pipeline's 10 wall is sealed by means of a ring seal 9.

A frontal part 1a arranged at the orifice 1b supports a coupling part 13 in order to connect the coupling part 39 to a shut-off device or another vehicle or possibly a moveable object in the pipe.

For energy storage, batteries 51 are advantageously located at a suitable place in the vehicle body.

For steering and controlling the vehicle, a programmable steering/control unit 22 is provided, which is comprised by an assembly of electronic units, including a receiver and a transmitter as well as metering instruments.

In the vehicle body 1 there is furthermore provided a drive mechanism 17. This drive mechanism 17 actuates an axle 18, which at its end is demountably secured to a frame 15 via a quick-fit connection 19. The quick-fit connection 19 is designed for example as a bayonet-coupling or as a screw-connection.

Moreover, the quick-fit connection 19 comprises pin connectors to connect the hydraulic leads 16a and electrical leads 16b. The frame 15a can be employed to carry a metering instrument and may be replaced by a coupling mechanism 15b, which, via the quick-fit connection 19, which connects to a shut-off device or a moveable body in the pipeline, supports itself against the shaft 18.

After the vehicle has been introduced into the pipe 10, the vehicle travels through the pipeline to a predetermined or metered location, whilst being controlled by the programmable control unit 22. Where there are small curve radii in the pipeline 10 it is preferable for the self-propelled vehicle to be segmented into two or more modules which are linked to each other, in particular a vehicle which comprises a propelling module 14, a power supply module 50 and a control module 20.

This division into several modules is particularly advantageous when a great supply of propelling power is demanded, since more powerful batteries and greater generator supplies can be installed within the same pipe diameter.

Figure 4:
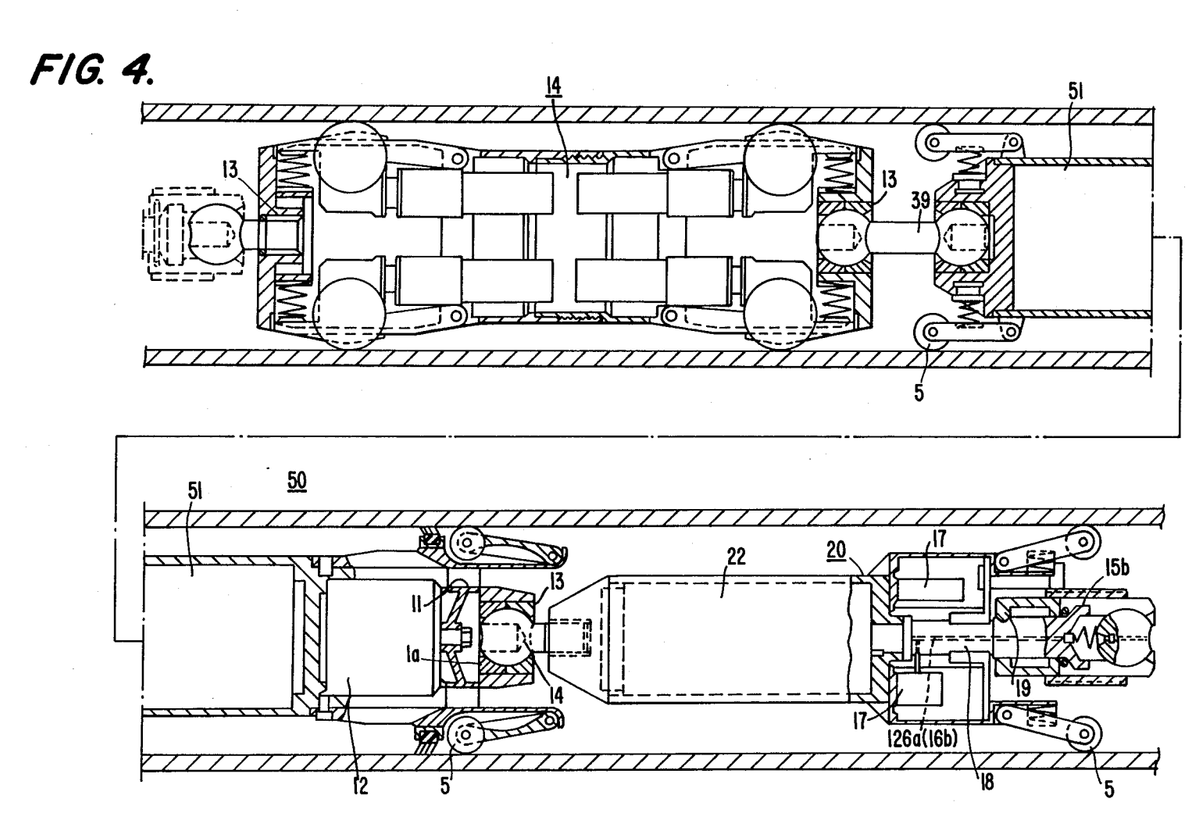
FIG. 4 shows a vehicle comprising three modules pivotally joined together.

The propelling module 14 is provided with drive modules 2 and has coupling parts 13 on each end-surface where the power supply module's 50 coupling part 39 will fit in, bringing the turbine 11, the generator 12 and the batteries 51.

The coupling part 13 arranged at the frontal portion 1a is connected with the control module 20 via a mechanical coupling part 39, and in the same way as the supply module 56 is provided with springloaded guiding and supporting rollers. The electrical connection lead 16b is arranged freely suspended or integrated in the mechanical coupling part.

Figure 2:
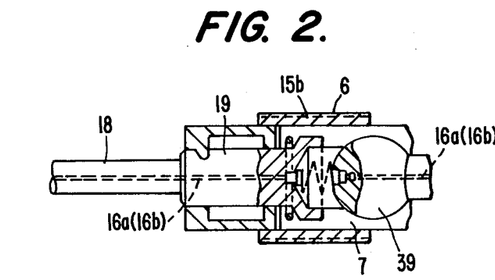
FIG. 2 shows a coupling mechanism for coupling to a device.

The programmable module 22 and the propelling mechanism 17 are mounted on the control module 20. The coupling mechanism 15b shown on FIG. 2 is connected to the end of the driving member 18 via a quick-fit coupling. This coupling mechanism 15b comprises a known hydraulic and/or electric connector and a known mechanical connector for the coupling part 39. In this way the hydraulic pipe 16a and/or the electric leads 16b can be coupled together and the hydraulic pipe 16a will lead to the drive mechanism 17 which constitutes the hydraulic motor, and the electric leads will lead to the supply module 50. The coupling part 14 is surrounded by a spring loaded-latch 7 and is secured by a displaceable hub 6.

Displacement of the sleeve 6 can be effected by remote control either hydraulically or by means of a not shown electro motor.

The vehicle can also be used during operation of a pipe-line in that arbitrary bodies for example a shut-off device or a measuring instrument can be transported into and/or transported out of the pipe-line and/or secured in the pipeline. In transporting a shut-off device, the shut-off device is coupled via the auto-propelled vehicle's coupling mechanism 15b and led to a predetermined location in the pipeline. The programmable steering module is appropriately designed so that it can be used as a remotely-operated steering module in that all necessary functions can be activated by remote control.

After a securing or anchoring mechanism as well as the shutoff device's sealing mechanism are activated via the hydraulic cable 16a, the coupling mechanism can be uncoupled by the sleeve 96 being displaced (see FIG. 2 and 4) and the vehicle can return to its starting point (the platform).

With the vehicle, according to the invention, an object which is transported into a pipe can also be transported out again. For instance it is possible to retrieve shut-off devices or metering instruments which are secured in the pipe, for control and cleaning. The vehicle couples itself to the secured device which is to be retrieved, takes over the coupling mechanism's 15b arranged hydraulic connections locking the device and leads it out of the pipeline 10. It can also move upstream and in vertical pipes as well as in branch pipelines. A preferred embodiment of the invention will in the following be more closely described with reference to FIGS. 5-20.

Figure 5:
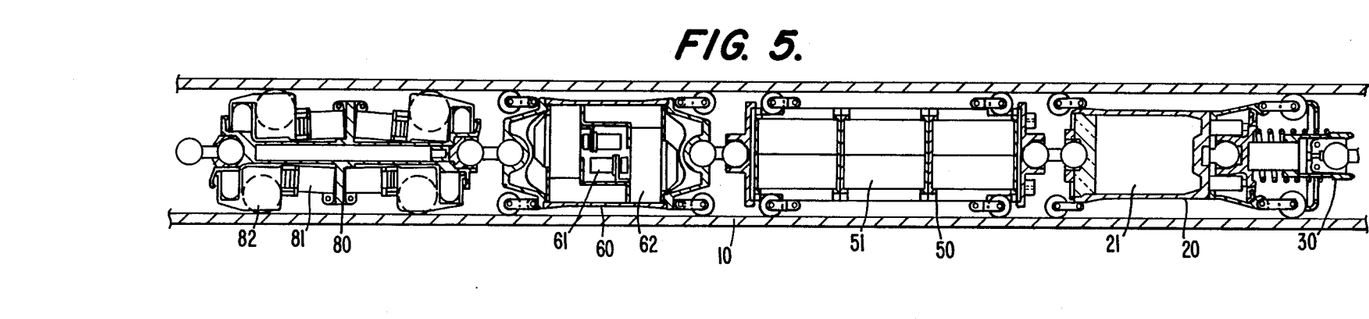
FIG. 5 shows a section of the vehicle according to a preferred embodiment of the invention.
Figure 6:
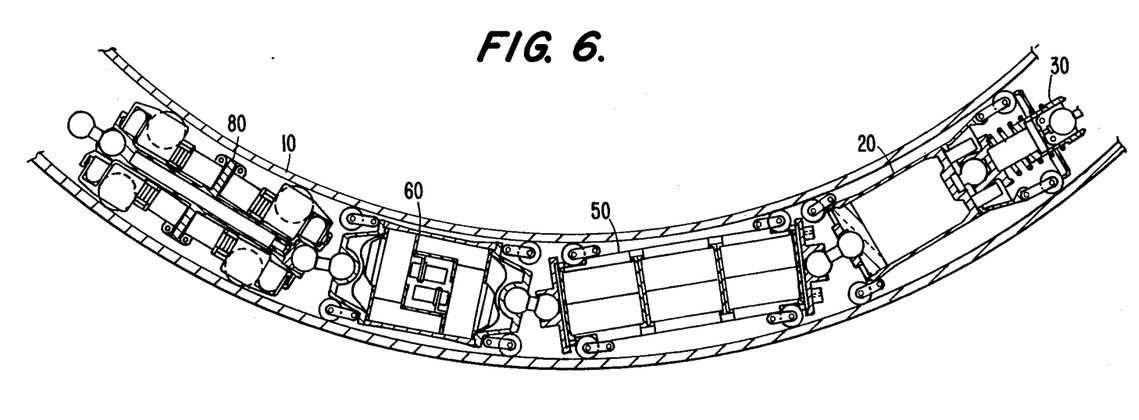
FIG. 6 shows a section of the vehicle situated in a bend in a pipeline.

FIGS. 5 and 6 show a section through the preferred embodiment of the vehicle, where the vehicle is placed in respectively a straight and a curved pipeline 10. The vehicle can carry a considerable cargo and can move in both directions, both horizontally and vertically in the pipeline. The vehicle is preferably dimensioned in order to move in pipe-lines with fluid pressure up to 200 bar.

In the preferred embodiment the vehicle consists of four modules which via ball-joints are coupled to each other. The four modules constitute respectively the control module 20, the power supply module 50, a hydraulic power module 60 and a drive module 80.

The vehicle comprises in the shown embodiment ten hydraulic motors 81 each of which are connected to a pair of drive wheels 82. The hydraulic motors 81 are connected to a hydraulic system comprising two gear pumps 61 driven by electric motors 62. The electric motors are electrically powered by batteries 51. The entire vehicle is controlled by a programmable module 22 situated in a pressure-proof housing 21. The control module 20 includes in addition a coupling mechanism 30, for connecting to and from modules which are to be transported in or out of a pipeline. The various modules are advantageously placed so that the drive module 80 faces the platform or the launching site of the vehicle. Thereafter in succession follow the hydraulic power module 60, the power supply module 50 and at the opposite end the control module 20. The drive module 80 is placed preferably next to the launching site because it is to have a braking purpose downward in the pipeline's 10 riser, and a pulling purpose in the opposite direction. The said placing of the drive module 80 will ensure the most stable transportation of the vehicle in the vertical parts of the pipe.

As mentioned previously the modules are coupled to each other via ball joints. The modules are prevented from rotating freely in relation to each other by means of wire cables (not shown in the drawing). On each end of each module two connection points on opposite sides are provided. The cables are connected cross-wise to the connecting points. The cables can also be used to carry flexible hydraulic hoses and electric cables.

Figure 7:
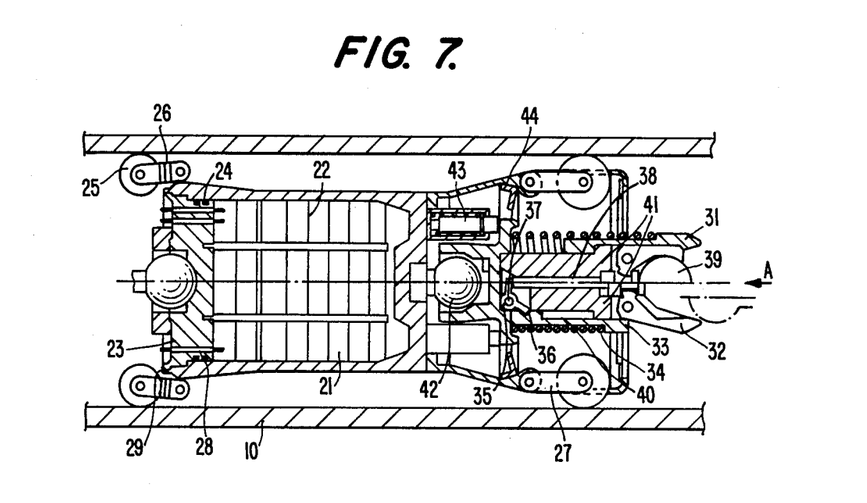
FIG. 7 shows a sideways section through the vehicle's control module.
Figure 8:
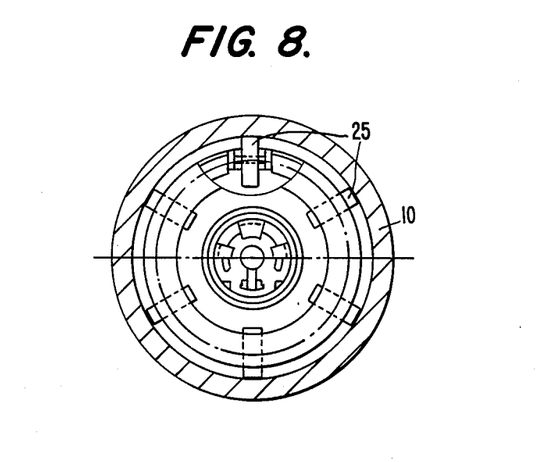
FIG. 8 shows an outline of the module along the line A in FIG. 7.

The control module 20 is shown in detail in the FIGS. 7 and 8 and contains electrical equipment and a programmable controller 22 with printed circuit boards 23 for the purpose of controlling the vehicle. In addition, the control module 20 includes a hydraulically actuated coupling mechanism 30 for connection of the vehicle to a module or equipment which is to be transported down into the pipeline or to be brought up from the pipeline.

The programmable device 22 is placed in a pressure-resistant housing 21 designed to be able to resist the extreme levels of pressure which may occur in a pipeline. A cover plate 23 in the pressure-resistant housing's 21 end parts is designed with concentrically arranged pressure-resistant glass bushings 28 which facilitate the passage of electric leads.

The cover plate 23 is sealed to the walls of the housing by means of two O-rings 24 and if necessary sealing welds 29.

Further, the control module 20 in the shown embodiment is provided with six guide rollers 25 at each end for placement against the pipeline's 10 internal wall. Each guide roller 25 is via an arm 26 pivotally attached to the control module 20 and is pressed with a pre-determined pressure outward against the pipeline wall by a not shown spring. Two oppositely situated rollers are equipped with pulse generators 27, for example reed contacts for measuring the vehicle's position. The mean value of both pulse generators 27 will be sufficient for measuring the vehicle's travel distance and to create a binary signal to the programmable controller 22. The hydraulically actuated coupling mechanism 30 comprises in the free end an outward facing, conical steering 31 and, in a preferred embodiment, four grab latches 32. An external annular piston 33, axially moveable by a spring 34, is provided in order to press the grab latches 32 radially inward to a locked position round a ball. The axially displaceable sleeve is retained 33 in a withdrawn position and with the spring 34 prestressed by means of a pivoted rocking lever on a ball bearing joint 37 with a latch 35 which engages a groove 36 on the inside of the sleeve 33. Through the coupling mechanism's central portion an axially running bore is arranged, in which a plunger piston 38 is located. When the piston 38 is axially actuated, this in turn, actuates the rocking lever 37 which then pushes the latch 35 out of the groove 36. The actual actuation of the plunger piston takes place simultaneously with the connection when the ball 39, around which the coupling mechanism 30 will grip, strikes against the piston 38 when it has reached the bottom of the control housing's 33 open frontal part. The outer sleeve 33 is pushed by the spring 34 axially outwards and thereby pressing the lock-latches 32 radially inwards to the locking position around the ball 39. The coupling can only be opened by the hydraulic fluid being pressed into an annular compartment 40 between the coupling mechanism's housing and the outer sleeve 33.

Switches are provided, preferably in the form of reed contacts 41, which give signals to the control module in the case of both coupling and decoupling. On coupling of the vehicle to modules placed in the pipeline 10 it will be desirable and sometimes necessary that the coupling mechanism 30 can pivot radially an angle in relation to the control module's 20 central axis. This is made possible by the coupling mechanism 30 being coupled to the control module's 20 frame via a ball joint 42, but the angular deflection will continuously be counteracted by six resilient plungers 43 arranged in a circle around the ball joint 42. In order to prevent too great angular deflection an angular travel limiter 44 is provided. The angular rotation Of the coupling device 30 enables coupling to take place not only in a straight pipeline, but also in a bend.

Figure 9:
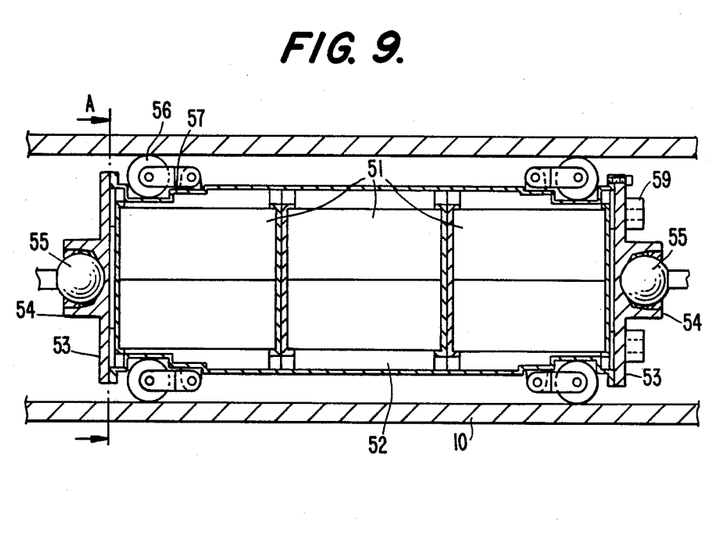
FIG. 9 shows a sideways section through the vehicle's power module.
Figure 10:
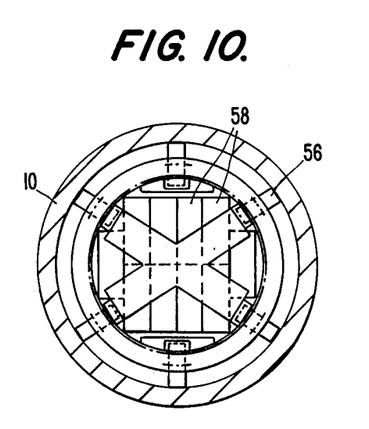
FIG. 10 shows an outline of the power module along the section A—A in FIG. 9.

The power supply module 50 is shown in detail in FIGS. 9 and 10 and includes in a preferred embodiment an explosion proof housing 52 which is able to resist great tensile and compressive forces. Each of the power supply module's 50 end flanges 53 is designed with a base 54 for receiving a ball 55. The power supply module 50 is at each end provided with guide rollers 56 resting against the pipeline's 10 internal wall. In the same manner as the control module 20, each guide roller 56 is pivotally mounted to the power supply module's 50 housing 52 via a member 57 and is forced radially outward by a not shown spring. The battery module's housing 52 encloses the vehicle's source of energy, which in the shown embodiment consists of a silver-zinc battery 51.

The battery 51 consists of thirty cells 58 in the shown embodiment. Each cell 58 comprises silver and zinc electrodes mounted in a plastic container, which is filled with a liquid electrolyte. A membrane conveys the external pressure to the electrolyte, in this manner compensating for any pressure difference. The greatest advantage with this type of battery is that it is insensitive to its position (horizontal, vertical, upside-down etc.) and to vibrations.

The external housing 57 is ventilated via apertures 59 and therefore does not need to be dimensioned to resist the internal pressure of the pipeline.

Several pressures are provided in order to prevent faults occurring in the battery when in operation. Each cell is therefore designed so that it is impossible for a state of malfunction to arise due to an internal short circuit in the cell. Should the battery be discharged by an impermissibly high current, e.g. due to a defect in a motor, a counteracting ohmic protection device (the resistance increases with excessive current) will reduce the current to a minimum and in this way protect the battery against a too fast discharging and possible overheating.

Figure 11:
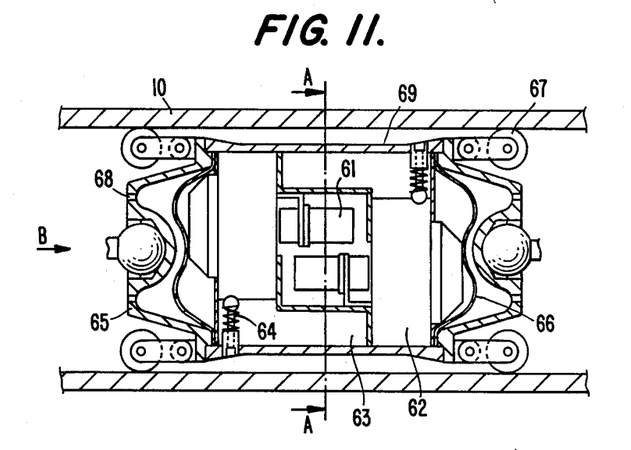
FIG. 11 shows a sideways section through the vehicle's hydraulic power module.
Figure 12:
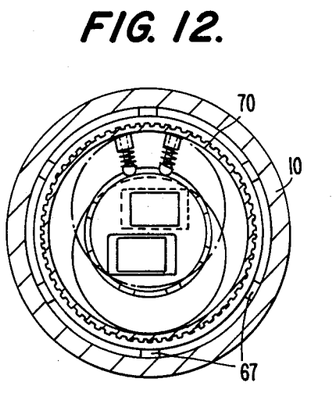
FIG. 12 shows an axial section through the hydraulic power module along the line A—A in FIG. 11.
Figure 13:
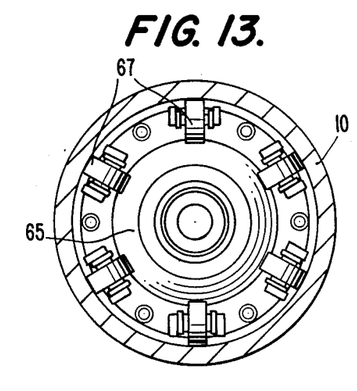
FIG. 13 shows an outline of the hydraulic power module along the arrow B in FIG. 11.

The hydraulic power supply module 60 is shown in detail in the FIGS. 11-13 and includes a hollow cylinder 69 which is also designed to function as a reservoir 63 for hydraulic oil. Two hydraulic pumps 61, each of which are driven by an electric motor 62, are together with the required valves located inside the tank 63. The electro motors 62 are isolated from the surrounding hydraulic oil and are in communication with the fluid in the pipeline 10 via two check valves 64 for pressure compensation and explosion protection.

The reservoir 63 is closed with a lid 65 at each end, and to each lid 65 a compensation membrane 66 is attached. The compensating membrane 66 forms a partition between the hydraulic oil and the pipeline's fluid, and is arranged to balance differences in amount which occur in the oil reservoir 63 as the drive wheels 82 of the hydraulic control module 80 rotate. Furthermore, the membrane 66 will compensate for the pressure in the entire hydraulic system. Apertures 68 are provided in the lids 65 to allow fluid which is located inside the pipeline 10 to be able to gain access to the membrane 66.

The hydraulic power supply module 60 is guided in the pipeline 10 by six outwardly facing rollers 67 at each end. Each roller is mounted on a pivot arm and forced outwards by a spring, in a similar manner as in the case of the control modules 20 and the power supply module 50. The reservoir 63 is designed so that oil returning from the motors is stored as long as possible before it is directed back to the pumps. This is in order to achieve a highest possible heat exchange from oil to the reservoir 63. On the outside of the reservoir 63, cooling ribs 70 are arranged in order to provide the maximum heat transfer from the reservoir 63 to the surroundings.

Figure 14:
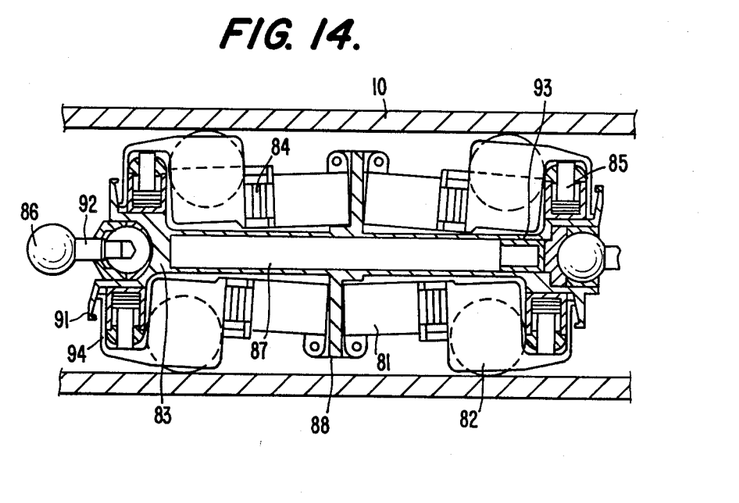
FIG. 14 shows a sideways section through the vehicle's drive module.
Figure 15:
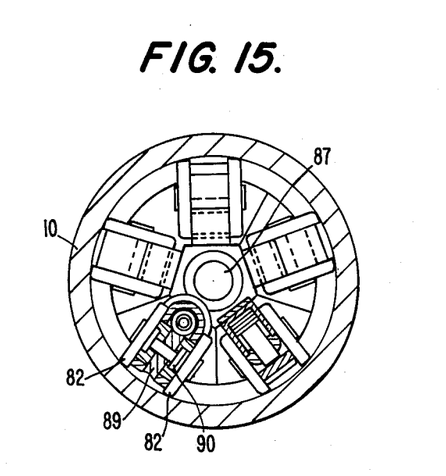
FIG. 15 shows a section through one of the drive wheel assembly in the drive module.

A preferred embodiment of the drive module 80 is shown in detail in the FIGS. 14 and 15 and includes a supporting module or trunk 83 and coupled to this, a plurality of drive modules each comprising a hydraulic motor 81, a worm gear 84 and a pair of drive wheels 82. In the shown embodiment the trunk 83 is equipped with ten propulsive modules.

In each propulsive module the hydraulic motor 81 is coupled via a coupling mechanism 84 to the worm gear 89 which in turn is coupled to the drive wheel 82. The drive wheels 82 are situated on each side of the worm gear 89 (FIG. 15). Each propulsive module, being a rigid assembly, is at its one end pivotally coupled to the trunk 83. The structure of the propulsion modules is made sufficiently rigid by utilizing the hydraulic motor's 81 housing as a frame. The driving wheels 82 are supplied with a sufficient thrust against the pipe wall 10 in that, at each propulsive module's one end, which faces away from the pivotally coupled end, there is a connection with a hydraulic piston 85. The hydraulic piston's 85 housing is rigidly secured to the trunk 83.

The trunk 83 constitutes the base for the propulsive modules, the hydraulic pistons 85 and for the remaining inits' coupling mechanisms 86. The trunk's 83 centrally situated axially located portion, includes an internal bore 87 and external, radially directed supporting parts 88. The supporting parts 88 are situated in the middle of the trunk 83, and constitute the mounting arrangements for the driving modules. The trunk's internal bore 87 is utilized as a pneumatic accumulator. In a preferred embodiment the accumulator is charged with nitrogen under high pressure, and is utilized to supply oil to four of the piston modules' 85 cylinders. The remaining cylinders are supplied with oil via the regular hydraulic system. A moveable piston 93 constitutes a partition between the gas and the hydraulic liquid.

Each driving module is pivotally mounted to one of the trunk's 83 middle supporting parts 88 and is in contact with one of the pressure pistons 85 which are mounted at each end of the trunk 83. Complementary claw-designed members 91, 94 are situated at each end of respectively the trunk 83 and each driving unit and limits the driving modules' radial excursion.

The driving wheels 8 are externally covered with a hard rubber layer in order to achieve a greatest possible frictional coefficient. The rubber layer is designed with grooves to make it simpler to pass internal welding seams in the pipeline 10.

Depending on drive resistance, either 4, 7 or 10 motors will be in operation at one time. On the six driving modules which are only coupled as the need arises, the coupling is arranged so that the wheels will rotate freely as long as the motor is disconnected.

As mentioned previously the driving module 80 comprises in a preferred embodiment ten drive modules with five drive modules on each half of the trunk. As it will be apparent from FIG. 14, some of the drive modules on the same side are axially displaced in relation to each other. This is done in order to ensure that a maximum of three wheels pass a welding seam in the pipeline at any one time.

The vehicle's mode of operation will be described further in the following.

Firstly, the vehicle is entered into a pig launcher, and the pressure in this pipeline is equalized with the rest of the pipeline 10 after flushing with nitrogen is carried out. After the pressure in the vehicle's hydraulic system is equalized with the pressure in the surrounding liquid, the electro motors 62 are started on signal from the control system 20. First, pressure is increased in the pressure accumulator 87 by means of the pumps 61 thereby effecting drive modules, which are continuously in operation to be pressed, outwards against the pipeline's 10 internal wall. As soon as the pressure in the accumulator 87 exceeds a predetermined lower pressure limit, for example 30 bar, a two-way valve opens and the hydraulic liquid can flow freely to the hydraulic motors 81. If the hydraulic pressure in the accumulator 87 drops below the lower pressure level during operation, for instance as the result of an increase in the internal diameter of the pipeline 10 which causes the drive wheels swing outwardly, the valve closes until the pressure in the accumulator 87 once again exceeds the lower pressure limit. If the hydraulic pressure exceeds an upper limit, for example 80 bar, a pressure relief valve opens between the accumulator 87 and the reservoir 63.

Depending on the travel resistance, either 4, 7 or 10 motors 81 will be in operation simultaneously. Four hydraulic motors 81 will be in continuous operation, and additionally 2 sets with 3 motors in each set can be automatically switched on depending on the oil pressure in the hydraulic system, which is a measure of the load. The six connectable drive units are equipped with a disengaging mechanism 90 which causes the associated wheels 82 to rotate freely when the motors 81 are disconnected. The wheels 82 rotate freely in the same manner if a motor 81 for one reason or another should be blocked.

The same pressure which is available for the hydraulic motors 81, is also supplied to the cylinders of the plungers 85. If the pipeline's 10 diameter decreases and the pistons 85 are thereby is forced to retract radially thus causing an increase in pressure in the cylinders of the plungers 85, a pressure relief valve will open the return pipe to the chamber, and so reduce the pressure in the cylinder.

When the vehicle travels down a vertical pipeline the four regular drive modules will be in operation and these will slow down the vehicle by working as pumps. For this purpose a special braking valve will be mounted in the return lead between the hydraulic motors 81 and the reservoir 63 in order to limit the flow of oil and to control the pressure which builds up behind the hydraulic motors. When the pressure is low the valve is held open by a spring, but when the pressure rises due to increased speed of the vehicle, the flow of oil causes the spring to be compressed. When the vehicle travels upwards, the hydraulic fluid-flow is circumventing the braking valve via a "by-pass pipe" containing a check valve.

When the vehicle has reached its destination bringing along with it, for example, a module which is to be parked inside the pipeline at this point, the control module's 20 coupling mechanism 30 is actuated into open position. This is brought about by two solenoid valves being activated simultaneously, one of them blocking the hydraulic supply to the motors 81 and the other opening for the pipe to the annular space 40 between the coupling mechanism and its external sleeve 33. When the external sleeve 33 is led to a position where it is secured by the retaining latch 35, the solenoid valves are brought back into its normal operational position by means of a spring.

In order to return the transport vehicle to the platform, the direction of rotation of the electric motors 62 is changed. The change of the direction of the electric motors 62 and of the pumps 61 causes the fluid flow and thereby the rotation direction of the hydraulic motors 81 to be turned.

A pressure valve is placed behind both the pumps 61 in order to avoid overloading of the electro motors 62. These valves will guide the fluid back to the reservoir 63 if required.

Above is described an example of an embodiment of a vehicle which is suited to being moved internally in a pipeline. If vital parts of the transport vehicle fail, alternative methods will be necessary in order to retrieve the transport vehicle to, for instance, a platform.

One alternative would be to attach to the transport vehicle a device which in the following will be described as a retrieval module 100. The retrieval module 100 is shown in detail in the FIGS. 16–18, and comprises a central trunk 101, guide rollers 102 situated on joint arms at each end, two sealing discs 103, and between these an emergency brake.

Figure 16:
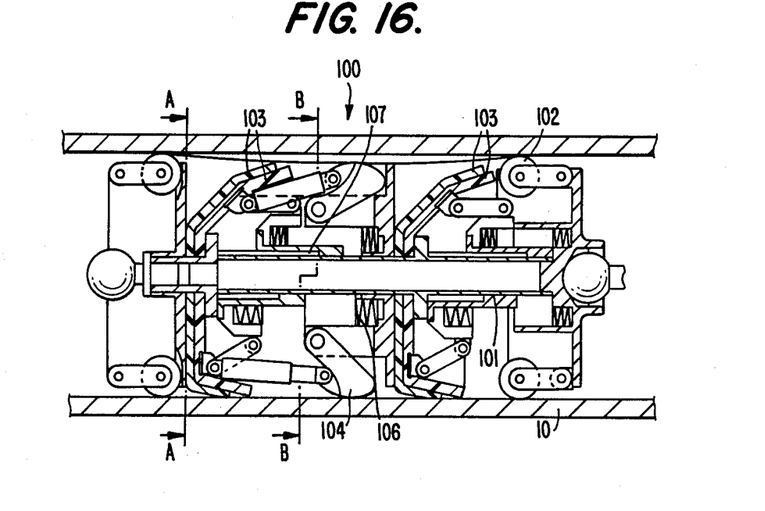
FIG. 16 shows a section through a retrieval module.
Figure 17:
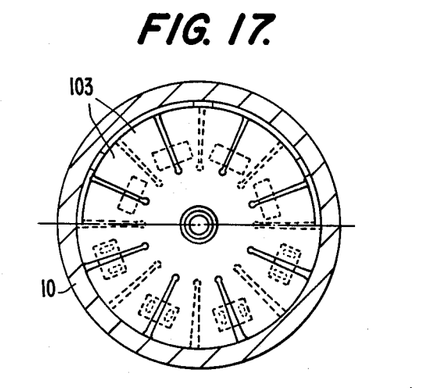
FIG. 17 shows an end section of the retrieval module along the section A—A in FIG. 16.
Figure 18:
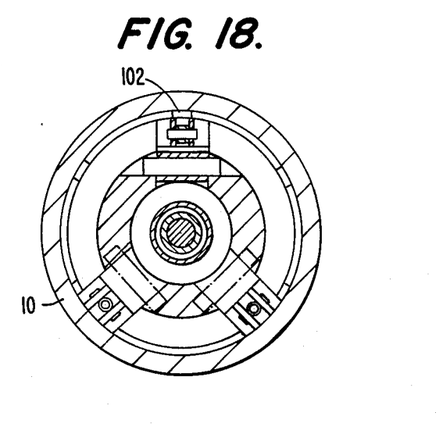
FIG. 18 shows an end section of the retrieval module along the section B—B in FIG. 16.

The sealing discs 103 are each connected to their own axially moveable hydraulic annular piston via pivot arms 105. When the transport vehicle is in its normal operational mode the annular pistons will be axially displaced as a result of the hydraulic pressure in a cylinder space 107. The hydraulic pressure works against the action of a spring 106 and causes the sealing discs' radial outer part to be retracted against the retrieval module's central trunk. The emergency brake consists preferably of three braking members 104 which are pivotally joined at the one end, and at the other, radially directed end, are provided with a frictional coating. The braking members' 104 outer part is designed with an arch-like outwardly facing surface.

The upper half of FIG. 16 illustrates an operational situation where the vehicle's hydraulic system functions normally. The lower half illustrates an operational situation where the vehicle's hydraulic system has broken down, and where the annular pistons' springs have pressed the sealing discs and the braking members 104 into engagement with the pipeline wall 10. If the breakdown occurs in a vertical riser pipe, an uncontrolled movement downwards in the riser, i.e. to the right in FIG. 16, will be prevented by the braking members 104 which will now prevent the vehicle from being movable in this direction. A fluid flow in the pipeline in the direction of the platform will be effective in bringing the retrieval module and the transport vehicle back to the starting point, since the sealing discs will function as propulsion cups engaging the pipeline's 10 wall.

Each sealing disc 103 is preferably made up of an elastomeric material, and consists of two discs placed on top of each other, and which are each in the axial direction split into segments overlapping each other, to enable radial movement of the sealing discs' 103 outer edge.

Another alternative for retrieving a damaged transport vehicle would be to use a rescue pig of the type described below. An embodiment of a rescue pig 110 is shown in detail in the FIGS. 19 and 20. The rescue pig 110 is shaped as a pipe and comprises two guide discs 111 and four propulsion discs 112. A coupling module identical to the control module's 20 coupling module 30 and comprising a conical guiding device 113, four grab latches 114, a locking sleeve 115, a retaining latch 116 and a plunger 117 is connected to the rescue pig 110.

Figure 19:
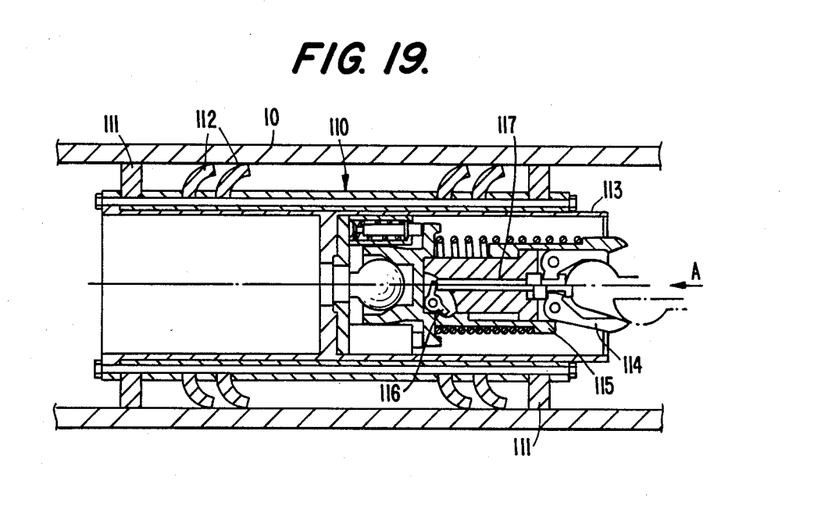
FIG. 19 shows a section through a rescue pig.
Figure 20:
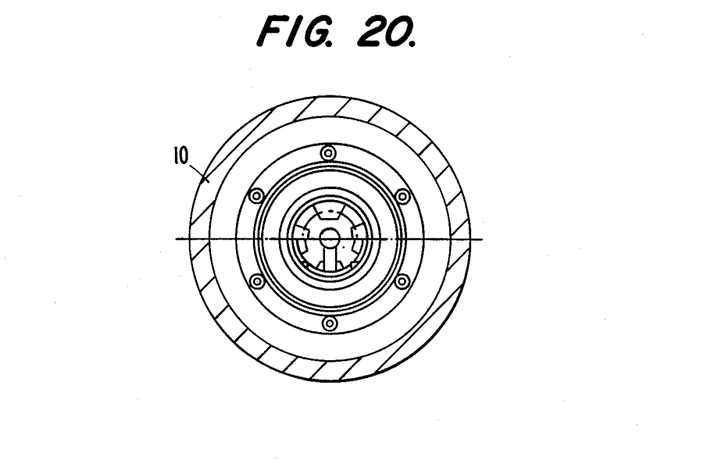
FIG. 20 shows an end section along the arrow A in FIG. 19.

The rescue pig 110 is launched from for example a platform and is driven by the fluid flow in the pipeline 10 to a damaged vehicle and is automatically connected to this. Then the direction of the fluid flow in the pipeline is changed and the rescue pig 110 with the vehicle is driven back to the platform.

What is claimed is:

1. A self-driven vehicle for pipelines comprising:
a vehicle body having means for allowing a medium flowing in the pipeline to flow through and around the vehicle body;
a drive module on the vehicle body resiliently bearing against an internal surface of the pipeline;
a hydraulic means for powering the drive module;
a power supply means for operating the hydraulic means;
a control module controlling at least movement of the vehicle in the pipeline; and
a drive mechanism arranged to anchor and secure and also to release a device to be used in the pipeline, the drive mechanism being connected via an axle to an end of the coupling mechanism on the vehicle for the connection to and the actuation of the device.

2. A self-driven vehicle for pipelines comprising:
a vehicle body having means for allowing a medium flowing in the pipeline to flow through and around the vehicle body;
a drive module on the vehicle body resiliently bearing against an internal surface of the pipeline;
a hydraulic means for powering the drive module;
a power supply means for operating the hydraulic means;
a control module controlling at least movement of the vehicle in the pipeline; and
wherein the controller is comprised of a remotely controllable control unit with a receiver and a transmitter as well as a device for measurement.

3. A self-driven vehicle for pipelines comprising:
a vehicle body having means for allowing a medium flowing in the pipeline to flow through and around the vehicle body;
a drive module on the vehicle body resiliently bearing against an internal surface of the pipeline;
a hydraulic means for powering the drive module;
a power supply means for operating the hydraulic means;
a control module controlling at least movement of the vehicle in the pipeline; and
wherein the control unit is a programmable control unit.

4. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
wherein the drive modules are pivotally arranged near a middle part of the trunk and with each drive wheel directed towards one end of the trunk and wherein hydraulic plungers are placed near end parts of the trunk, and the drive modules are provided with complementary claw-shaped members which engage with each other and act to limit radial excursion of the drive modules.

5. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
wherein the trunk comprises a centrally placed, axially running portion, further comprising an internal bore and radially directed brackets placed at the middle portion of the trunk to provide pivotal arrangements for the drive modules.

6. A self-driven vehicle for pipeline comprising:
a vehicle body having means for allowing a medium flowing in the pipelines to flow through and around the vehicle body, the vehicle being formed of pivotally joined modules, the modules comprising:
a drive module on the vehicle body having a centrally located supported trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
hydraulic plungers placed at each end of the trunk and a hydraulic bore comprising an accumulator which supplies hydraulic pressure to at least one of the hydraulic plungers.

7. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
wherein the drive means comprises ten drive means, four of which are arranged to be in continuous operation and two remaining sets of drive means with three drive means in each set which are connected depending on drive resistance.

8. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
wherein the drive means comprises five drive means on each half of the trunk, at least one of the drive means being axially displaced in relation to the other drive means to ensure that all the driving wheels on the same side do not pass a welding seam at the same time.

9. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
wherein the hydraulic power supply modules reservoir is limited by a hollow cylinder which at each end comprises a lid and wherein a compensating membrane is secured to an inside of the lid, the lid being provided with apertures enabling the compensating membrane to compensate for variations in amount which may arise in the reservoir during operation.

10. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;
a hydraulic means for powering the drive module, the hydraulic means comprising a hydraulic supply module with a reservoir for hydraulic fluid and electrically driven fluid pumps;
a power supply means for operating the hydraulic system comprising a power supply module containing batteries;
a control module for controlling at least movement of the vehicle in the pipeline, the control module comprising a programmable controller, a distance meter and a coupling mechanism enabling connection and disconnection of modules which are to be transported in the pipeline; and
wherein the coupling mechanism in the control module comprises conical steering grab latches an external sleeve in contact with an axially functioning spring an internal groove in the sleeve into which groove a latch with a rocking lever can grip, and an axial plunger piston, and wherein the coupling mechanism is able to grip around a coupling ball so that the ball when it is led to the bottom of the conical steering displaces the plunger piston which, via the rocking lever, leads a latch out of the internal groove and wherein the axially moveable spring pushes the sleeve axially outwards and at the same time pushes the grab latches radially inwards to a locking position around the ball.

11. A self-driven vehicle for pipelines comprising:
a vehicle body having means for allowing a medium flowing in the pipeline to flow through and around the vehicle body, the vehicle being formed of pivotally joined modules, the modules comprising:
a drive module on the vehicle body having a centrally located support trunk and a front and rear set of drive means each pivotally secured to the drive module and provided with hydraulically driven drive wheels pushed in a direction to resiliently bear against an interior wall of the pipeline;

a hydraulic means for powering the drive module, the hydraulic means comprising a hydraulic supply module with a reservoir for hydraulic fluid and electrically driven fluid pumps;

a power supply means for operating the hydraulic system comprising a power supply module containing batteries;

a control module for controlling at least movement of the vehicle in the pipeline, the control module comprising a programmable controller, a distance meter and a coupling mechanism enabling connection and disconnection of modules which are to be transported in the pipeline; and a rescue pig which can be conveyed with the fluid flow in the pipeline and can be coupled with the vehicle and can bring the vehicle back to a starting point by changing the direction of the fluid flow in the pipeline.

12. A self-driven vehicle for pipelines comprising:

a vehicle body having means for allowing a medium flowing in the pipeline to flow through and around the vehicle body, the vehicle being formed of pivotally joined modules, the modules comprising:

a drive module on the vehicle body having a centrally located supported trunk and a front and rear set of drive means each pivotally secured to the drive module and provided with hydraulically driven drive wheels pushed in a direction to resiliently bear against an interior wall of the pipeline;

a hydraulic means for powering the drive module, the hydraulic means comprising a hydraulic supply module with a reservoir for hydraulic fluid and electrically driven fluid pumps;

a power supply means for operating the hydraulic system comprising a power supply module containing batteries;

a control module for controlling at least movement of the vehicle in the pipeline, the control module comprising a programmable controller, a distance meter and a coupling mechanism enabling connection and disconnection of modules which are to be transported in the pipeline.

13. Vehicle according to claim 12, comprising a retrieval module enabling retrieval of the vehicle by employing fluid flow in the pipeline.

14. Vehicle according to claim 12, wherein the drive module comprises a centrally located support trunk (83), each drive module further comprising in succession a hydraulic motor, a coupling mechanism, a worm gear and two wheels which are rigidly coupled together and at one end are pivotally joined to the trunk and at the other end are actuated by a hydraulic plunger to bear against the pipeline interior wall.

* * * * *